(12) United States Patent
Hsieh

(10) Patent No.: US 12,192,980 B2
(45) Date of Patent: Jan. 7, 2025

(54) METHOD AND USER EQUIPMENT FOR SCHEDULING WITH MULTIPLE CELLS

(71) Applicant: MEDIATEK INC., Hsin-Chu (TW)

(72) Inventor: Chi-Hsuan Hsieh, Hsin-Chu (TW)

(73) Assignee: MEDIATEK Inc., Hsinchu (TW)

( * ) Notice: Subject to any disclaimer, the term of this patent is extended or adjusted under 35 U.S.C. 154(b) by 184 days.

(21) Appl. No.: 17/693,241

(22) Filed: Mar. 11, 2022

(65) Prior Publication Data
US 2022/0330272 A1    Oct. 13, 2022

Related U.S. Application Data

(60) Provisional application No. 63/171,635, filed on Apr. 7, 2021.

(51) Int. Cl.
*H04W 72/12* (2023.01)
*H04L 5/00* (2006.01)
*H04L 27/26* (2006.01)
*H04W 72/0446* (2023.01)
*H04W 72/20* (2023.01)

(52) U.S. Cl.
CPC .......... *H04W 72/12* (2013.01); *H04L 5/0053* (2013.01); *H04L 27/26025* (2021.01); *H04W 72/0446* (2013.01); *H04W 72/20* (2023.01)

(58) Field of Classification Search
CPC . H04W 72/12; H04W 72/0446; H04W 72/20; H04W 24/10; H04L 5/0053; H04L 27/26025; H04L 5/0044; H04L 5/0048; H04B 7/0626
See application file for complete search history.

(56) References Cited

U.S. PATENT DOCUMENTS

| | | | |
|---|---|---|---|
| 10,951,383 B2* | 3/2021 | Lu | H04L 5/0094 |
| 2020/0146064 A1* | 5/2020 | Oh | H04W 74/0808 |
| 2022/0116969 A1* | 4/2022 | He | H04W 72/1273 |
| 2022/0217755 A1* | 7/2022 | Fu | H04W 8/24 |
| 2022/0304026 A1* | 9/2022 | MolavianJazi | H04L 27/26025 |

OTHER PUBLICATIONS

Taiwan IPO, office action for the Taiwanese patent application 111112190 (no English translation is available), dated Dec. 30, 2022 (11 pages).
R1-2102937, vivo, "Discussion on CSI request constraint per slot considering xCC scheduling with different numerologies", 3GPP TSG RAN WG1 #104-bis-e, sections 1, 2, dated Apr. 12-20, 2021 (2 pages).
R1-2102179, MediaTek, "Summary for [104-e-NR-7.1CRs-11] Clarification on CSI request constraint per slot", 3GPP TSG RAN WG1 Meeting #104-e, figure 1, sections 2.1, 2.2.1, dated Jan. 25-Feb. 5, 2021 (10 pages).

* cited by examiner

*Primary Examiner* — Afshawn M Towfighi
(74) *Attorney, Agent, or Firm* — Helen Mao; Zheng Jin; Imperium Patent Works

(57) ABSTRACT

Method and UE are provided for scheduling for scheduling with multiple cells. In particular, a UE can connect to a plurality of cells in a network. The UE can determine a reference slot length according to an SCS of a first cell of the plurality of cells.

16 Claims, 8 Drawing Sheets

METHOD AND USER EQUIPMENT FOR SCHEDULING WITH MULTIPLE CELLS

CROSS REFERENCE TO RELATED APPLICATIONS

This application claims priority under 35 U.S.C. § 119 from U.S. Provisional Application No. 63/171,635, entitled "Scheduling Constraint on A-CSI Request/Report per Slot when the Triggering PDCCH and the CSI-RS Have Same/ Different Numerologies," filed on Apr. 7, 2021, the subject matter of which is incorporated herein by reference.

TECHNICAL FIELD

The disclosed embodiments relate generally to wireless communication, and, more particularly, to method and user equipment for scheduling with multiple cells.

BACKGROUND

In conventional network of 3rd generation partnership project (3GPP) 5G new radio (NR), aperiodic channel state information (CSI) reporting/aperiodic channel state information-reference signal (CSI-RS) are transmitted between a user equipment (UE) and a cell, and a triggering physical downlink control channel (PDCCH) and a corresponding CSI-RS have the same numerology. As for a downlink constraint, the UE is not expected to receive more than one downlink control information (DCI) with non-zero CSI request per slot in a cell group. As for an uplink constraint, the UE is not expected to receive more than one aperiodic CSI report request for transmission in a given slot in the cell group.

However, when aperiodic CSI reporting/aperiodic CSI-RS are transmitted between a UE and multiple cells and a triggering PDCCH and a corresponding CSI-RS have different numerologies, some downlink constraint and uplink constraint should be adjusted but the corresponding detail has not been discussed yet.

SUMMARY

Method and user equipment (UE) are provided for scheduling for scheduling with multiple cells. In particular, a UE can connect to a plurality of cells in a network. The UE can determine a reference slot length according to a sub-carrier spacing (SCS) of a first cell of the plurality of cells.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
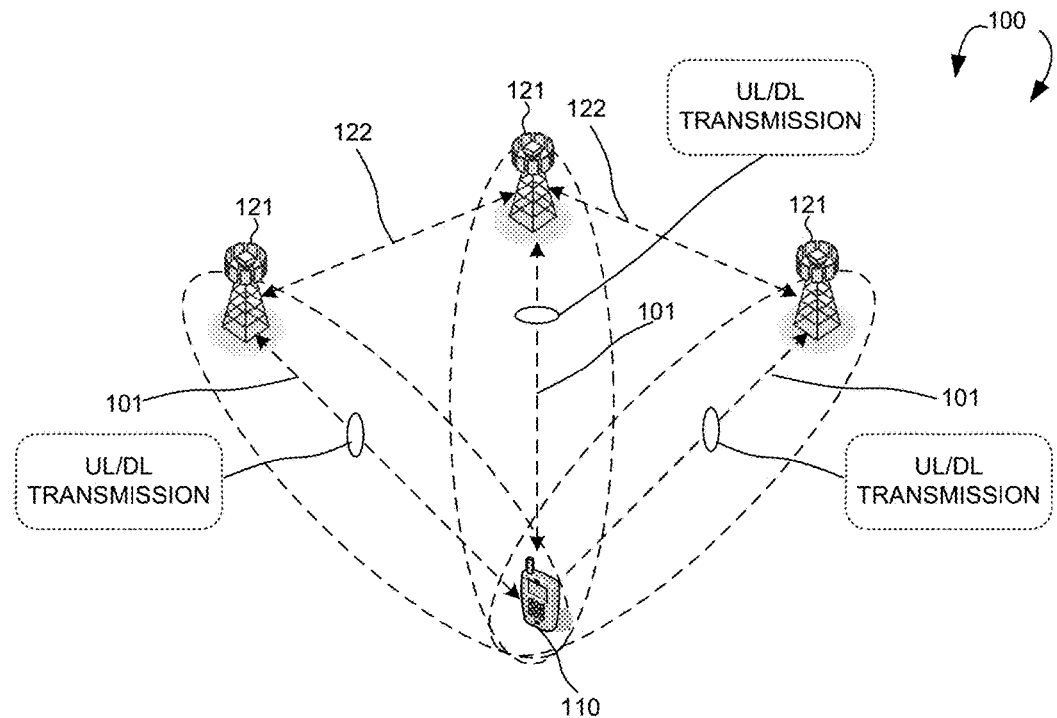
FIG. 1 illustrates an exemplary 5G new radio network supporting scheduling with multiple cells in accordance with embodiments of the current invention.

FIG. 1 illustrates an exemplary 5G new radio (NR) network 100 supporting scheduling with multiple cells in accordance with aspects of the current invention. The 5G NR network 100 includes a user equipment (UE) 110 communicatively connected to a plurality cells 121.

Each cell 121 may provide radio access using a Radio Access Technology (RAT) (e.g., the 5G NR technology). The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

Each cell 121 may provide communication coverage for a geographic coverage area in which communications with the UE 110 is supported via a communication link 101. The communication links 101 shown in the 5G NR network 100 may respectively include uplink (UL) transmissions from the UE 110 to the cells 121 (e.g., on the Physical Uplink Control Channel (PUCCH) or Physical Uplink Shared Channel (PUSCH)) or downlink (DL) transmissions from the cells 121 to the UE 110 (e.g., on the Physical Downlink Control Channel (PDCCH) or Physical Downlink Shared Channel (PDSCH)). The cells 121 may communicate with each other via a communication link 122 between two cells 121.

Figure 2:
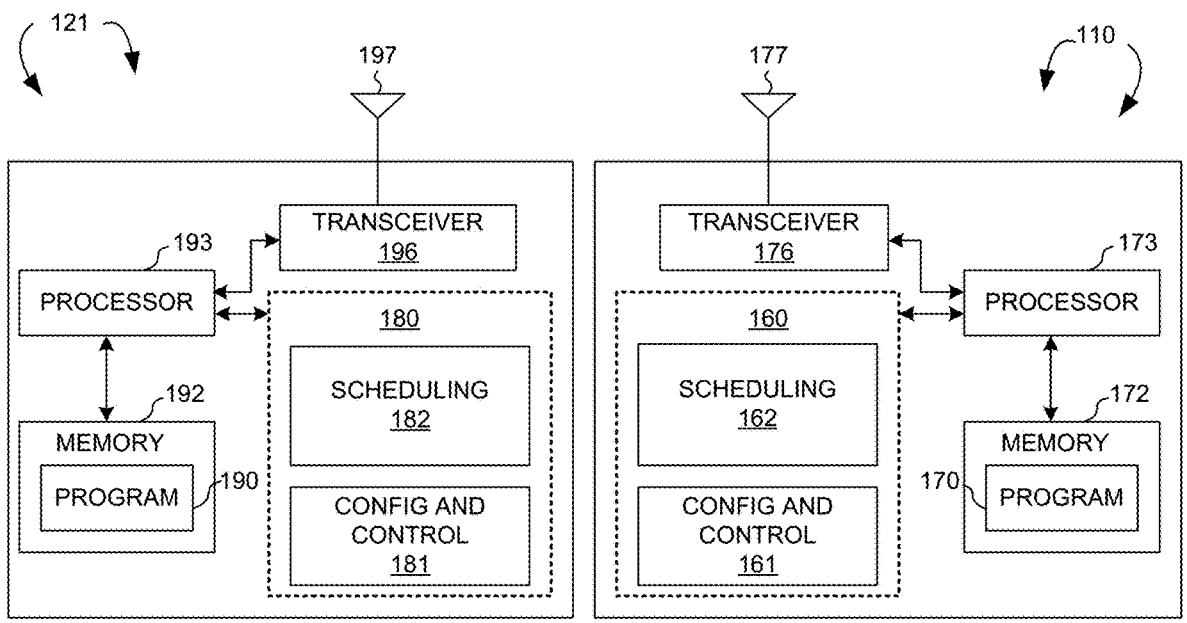
FIG. 2 is a simplified block diagram of the cell and the UE in accordance with embodiments of the current invention.

FIG. 2 is a simplified block diagram of one cell 121 and the UE 110 in accordance with embodiments of the present invention. For the cell 121, an antenna 197 transmits and receives radio signal. A radio frequency (RF) transceiver module 196, coupled with the antenna, receives RF signals from the antenna, converts them to baseband signals and sends them to processor 193. RF transceiver 196 also converts received baseband signals from the processor 193, converts them to RF signals, and sends out to antenna 197. Processor 193 processes the received baseband signals and invokes different functional modules and circuits to perform features in the cell 121. Memory 192 stores program instructions and data 190 to control the operations of the cell 121.

Similarly, for the UE 110, antenna 177 transmits and receives RF signals. RF transceiver module 176, coupled with the antenna, receives RF signals from the antenna, converts them to baseband signals and sends them to processor 173. The RF transceiver 176 also converts received baseband signals from the processor 173, converts them to RF signals, and sends out to antenna 177. Processor 173 processes the received baseband signals and invokes different functional modules and circuits to perform features in the UE 110. Memory 172 stores program instructions and data 170 to control the operations of the UE 110.

The cell 121 and the UE 110 also include several functional modules and circuits that can be implemented and configured to perform embodiments of the present invention. In the example of FIG. 2, the cell 121 includes a set of control functional modules and circuit 180. Scheduling circuit 182 handles scheduling with multiple cells and associated network parameters for the UE 110. Configuration and control circuit 181 provides different parameters to configure and control the UE 110. The UE 110 includes a set of control functional modules and circuit 160. Scheduling circuit 162 handles scheduling with multiple cells and associated network parameters. Configuration and control circuit 161 handles configuration and control parameters from the cells 121.

Note that the different functional modules and circuits can be implemented and configured by software, firmware, hardware, and any combination thereof. The function modules and circuits, when executed by the processors 193 and 173 (e.g., via executing program codes 190 and 170), allow the cells 121 and the UE 110 to perform embodiments of the present invention.

In some embodiments, the UE 110 may connect to the cells 121. The cells 121 may have at least two cells with different sub-carrier spacings (SCSs). After connecting to the cells 121, the UE 110 may determine a reference slot length according to an SCS of a first cell of the cells 121. The beginning of the reference slot length needs to be aligned with a first slot of a specific cell. The slot offset should be a multiple of smallest slot length among the cells.

In some embodiments, the reference slot length may be equal to a length of one slot corresponding to the SCS of the first cell. In some embodiments, the SCS of the first cell may be the minimum SCS among SCSs of the cells 121.

Figure 3A:
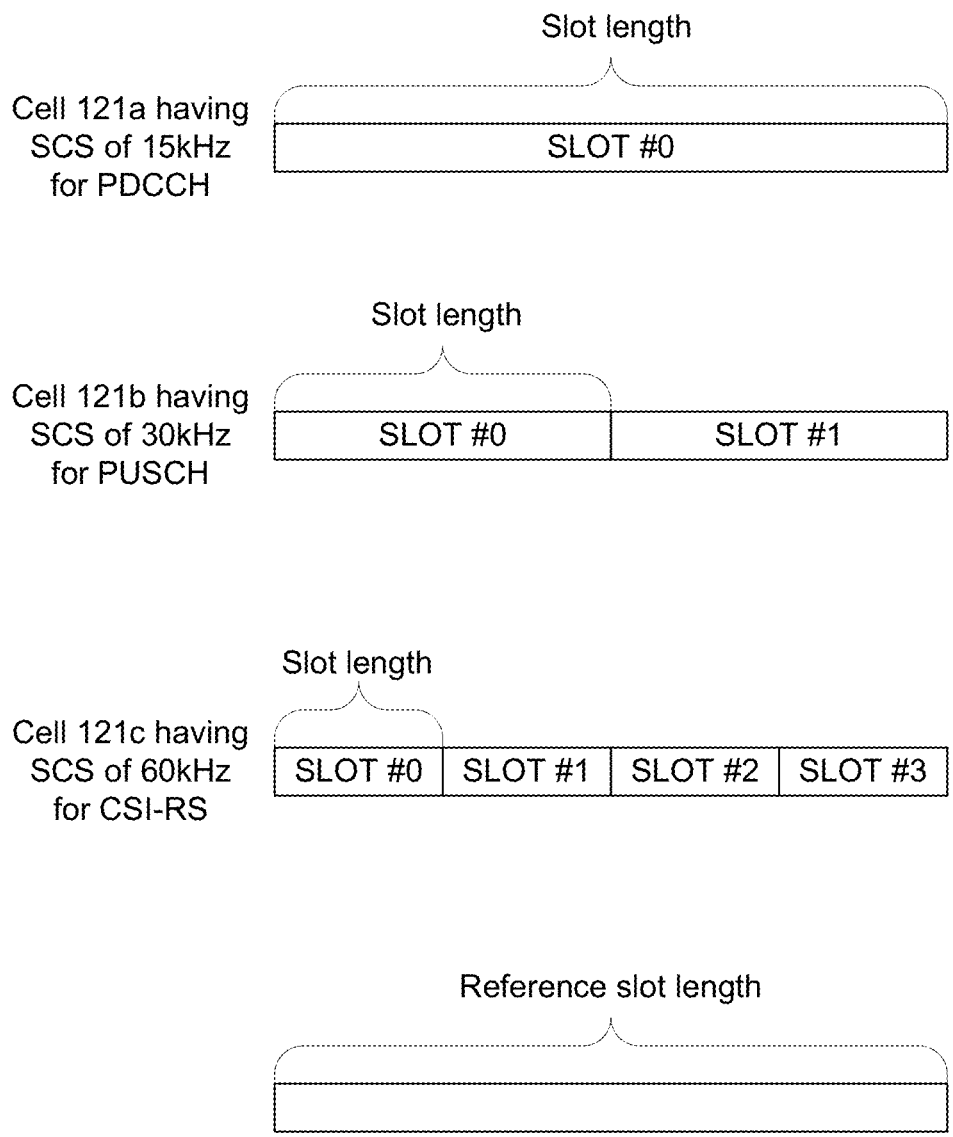
FIG. 3A illustrates one example of slots of the cells with different SCSs in accordance with embodiments of the current invention.

FIG. 3A illustrates one example of slots of the cells 121 with different SCSs in accordance with one novel aspect. In particular, after connecting to the cells 121, some specific cells of the cells 121 are determined. In this example, the cell 121a having SCS 15 kHz is for transmission of PDCCH, the cell 121b having SCS 30 kHz is for transmission of PUSCH and the cell 121c having SCS 60 kHz is for transmission of channel state information reference signal (CSI-RS). More specifically, it is determined that: (1) PDCCH is transmitted between the UE 110 and the cell 121a having SCS 15 kHz; (2) PUSCH is transmitted between the UE 110 and the cell 121b having SCS 30 kHz; and (3) CSI-RS is transmitted between the UE 110 and the cell 121c having SCS 60 kHz.

In this example, the UE 110 determines that the minimum SCS among SCSs of the cells 121a to 121c is SCS 15 kHz of the cell 121a. Then, the UE 110 determines the reference slot length is equal to a length of one slot corresponding to the SCS 15 kHz of the cell 121a.

In some embodiments, slots #0 of the cells 121a to 121c are not aligned. Therefore, a beginning of the reference slot length needs to be aligned with a first slot of a specific cell.

Figure 3B:
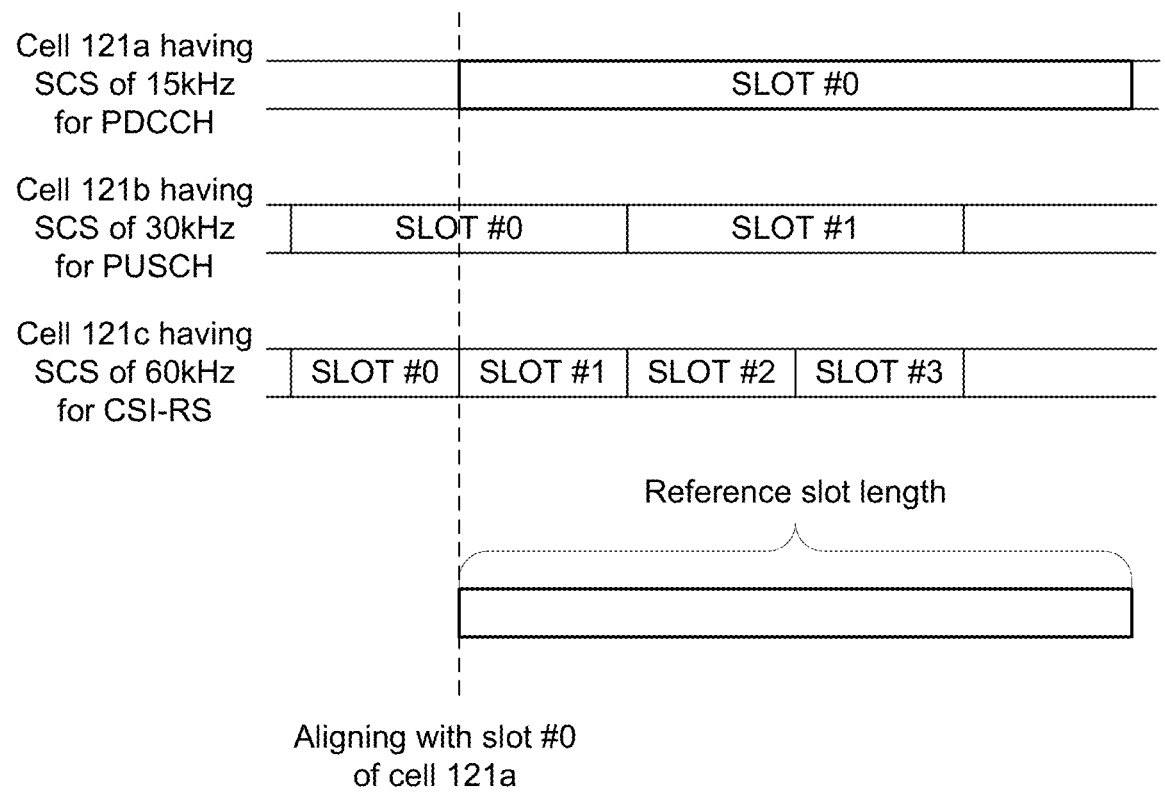
FIG. 3B illustrates one example of aligning a reference slot length with slots of the cells in accordance with embodiments of the current invention.

FIG. 3B illustrates one example of aligning the reference slot length with slots of the cells 121 in accordance with one novel aspect. As for CSI request constraint (i.e., downlink constraint), the UE 110 aligns the beginning of the reference slot with slot #0 of cell for PDCCH where downlink control information (DCI) carrying CSI request is transmitted. In other words, the UE 110 further aligns the beginning of the reference slot with slot #0 of the cell 121a.

Accordingly, the UE 110 may then receive single CSI request by PDCCH from the cell 121a within the reference slot length. In particular, the UE 110 may not receive more than one CSI request by PDCCH from the cell 121a within the reference slot length, and may only execute one CSI request within the reference slot. In other words, the UE 110 may then cancel expecting (i.e., the UE 110 is not expected) to receive more than more CSI request by PDCCH from the cell 121a within the reference slot length. For example, if the UE receives two CSI requests within one reference slot length, then the UE 110 may drop one of the CSI requests and execute only one CSI request within the reference slot length accordingly.

Figure 3C:
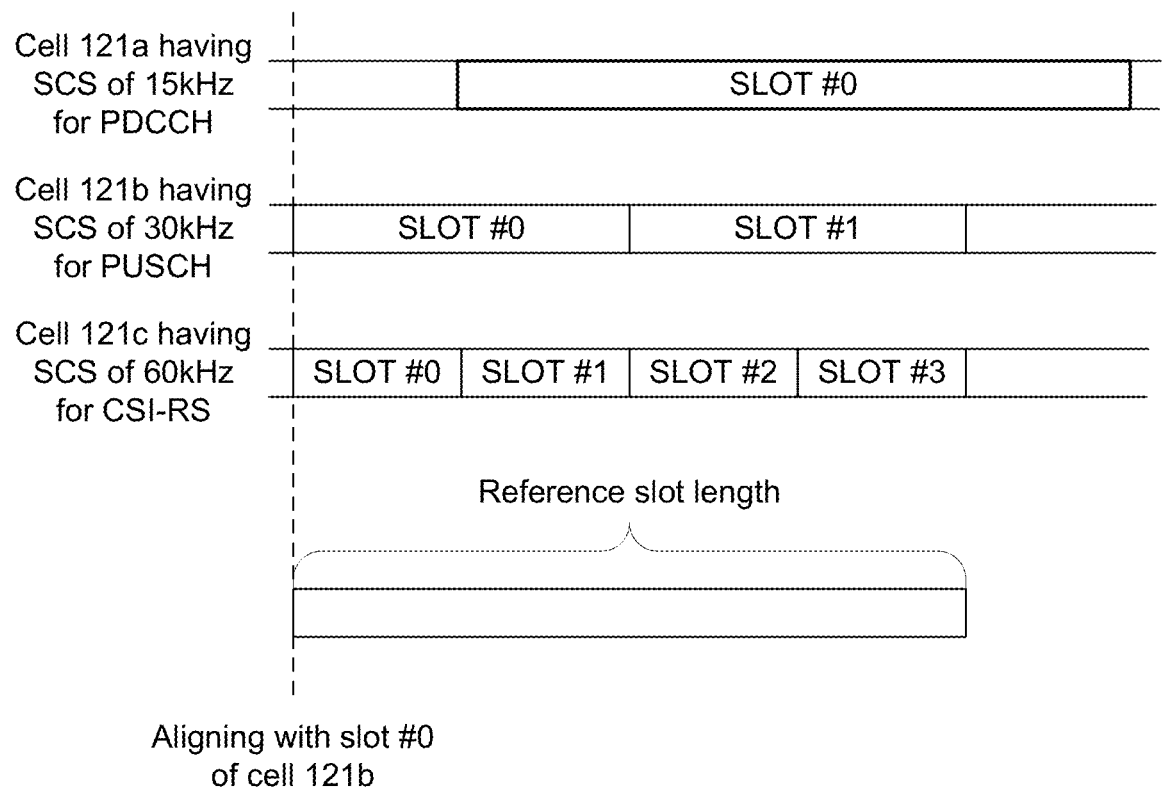
FIG. 3C illustrates one example of aligning a reference slot length with slots of the cells in accordance with embodiments of the current invention.

FIG. 3C illustrates one example of aligning the reference slot length with slots of the cells 121 in accordance with one novel aspect. As for CSI report constraint (i.e., uplink constraint), the UE 110 further aligns the beginning of the reference slot with slot #0 of cell for PUSCH where CSI report is transmitted. In other words, the UE 110 further aligns the beginning of the reference slot with slot #0 of the cell 121b.

Accordingly, the UE 110 may then receive single CSI report request by PUSCH from the cell 121b within the reference slot length. In particular, the UE 110 may not receive more than one CSI report request by PUSCH from the cell 121b within the reference slot length, and may only execute one CSI report request within the reference slot. In other words, the UE 110 may then cancel expecting (i.e., the UE 110 is not expected) to receive more than more CSI report request by PUSCH from the cell 121b within the reference slot length. For example, if the UE receives two CSI report requests in one slot, then the UE 110 may drop one of the CSI report requests and execute only one CSI report request accordingly.

It should be noted that, in some embodiments, one specific cell of the cells may be determined for PDCCH, PUSCH, CSI-RS, or any combination of PDCCH, PUSCH and CSI-RS. It is not intended to limit the number of the specific cells.

Figure 4A:
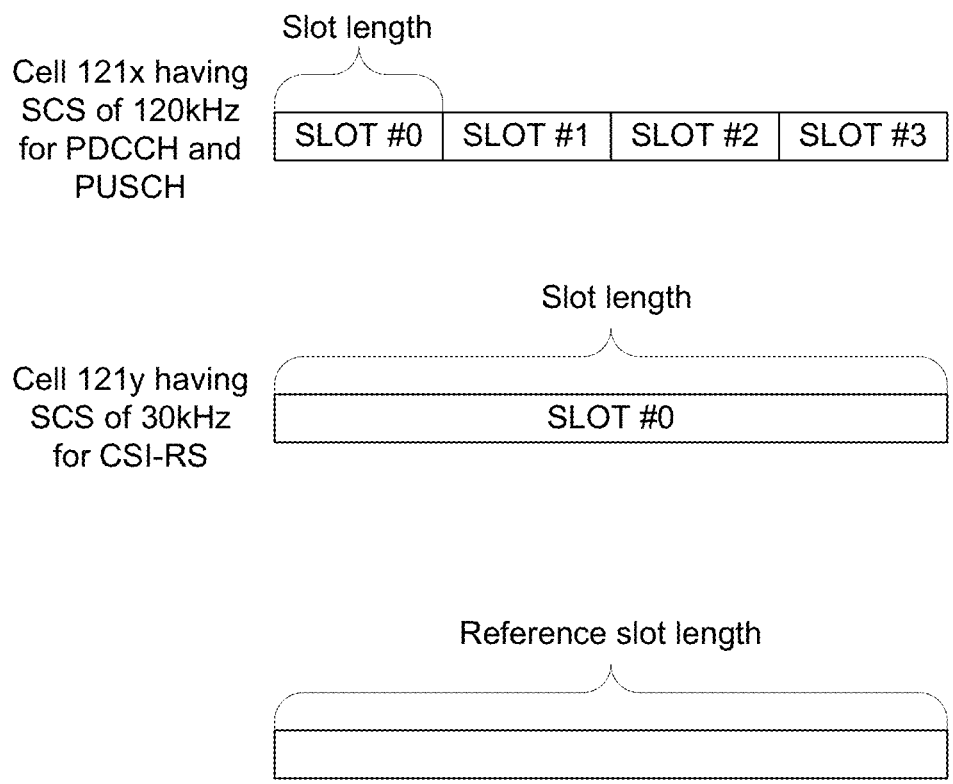
FIG. 4A illustrates one example of slots of the cells with different SCSs in accordance with embodiments of the current invention.

FIG. 4A illustrates one example of slots of the cells 121 with difference SCSs in accordance with one novel aspect. In particular, after connecting to the cells 121, some specific cells of the cells 121 are determined. In this example, the cell 121x having SCS 120 kHz is for transmissions of PDCCH and PUSCH and the cell 121y having SCS 30 kHz is for transmission of CSI-RS. More specifically, it is determined that: (1) PDCCH and PUSCH are transmitted between the UE 110 and the cell 121x having SCS 120 kHz; and (2) CSI-RS is transmitted between the UE 110 and the cell 121y having SCS 30 kHz.

In this example, the UE 110 determines that the minimum SCS among SCSs of the cells 121x and 121y is SCS 30 kHz of the cell 121y. Then, the UE 110 determines the reference slot length is equal to a length of one slot corresponding to the SCS 30 kHz of the cell 121y.

In some embodiments, slots #0 of the cells 121x and 121y are not aligned. Therefore, a beginning of the reference slot length needs to be aligned with a first slot of a specific cell.

Figure 4B:
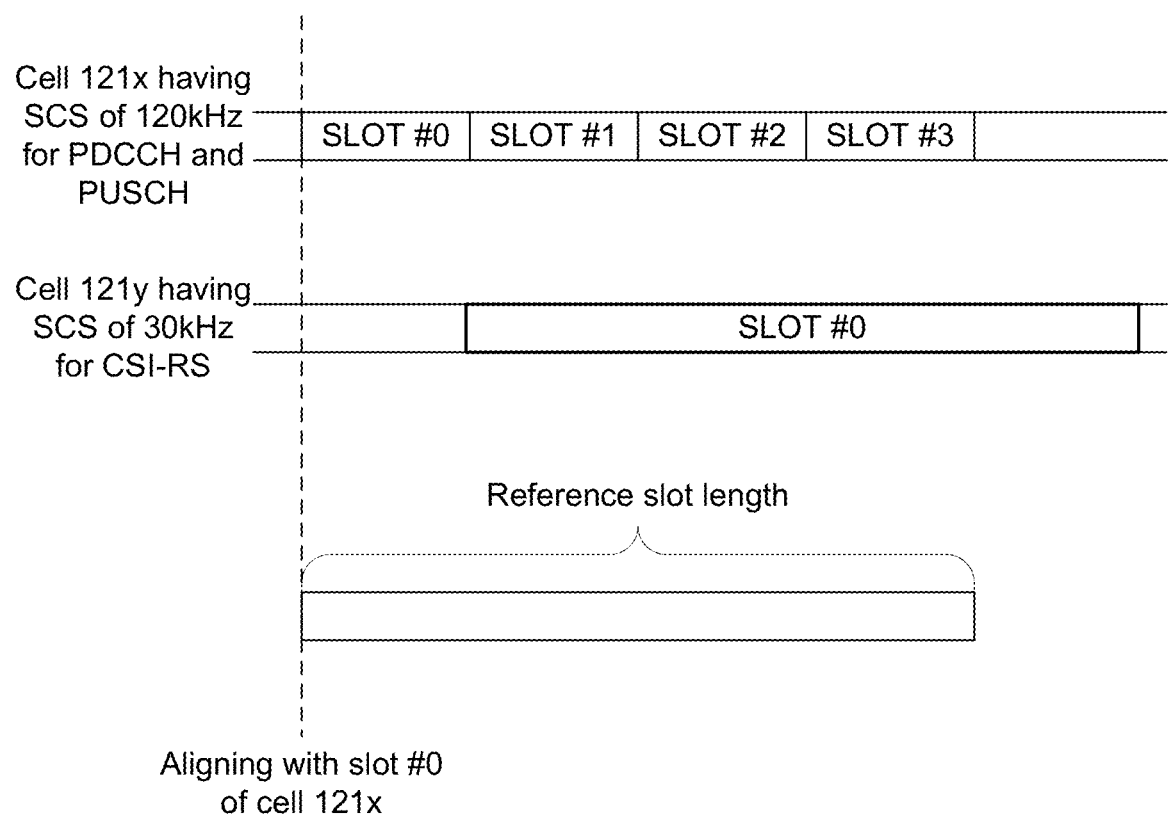
FIG. 4B illustrates one example of aligning a reference slot length with slots of the cells in accordance with embodiments of the current invention.

FIG. 4B illustrates one example of aligning the reference slot length with slots of the cells 121 in accordance with one novel aspect. As for CSI request constraint (i.e., downlink constraint), the UE 110 further aligns the beginning of the reference slot with slot #0 of cell for PDCCH where DCI carrying CSI request is transmitted. In other words, the UE 110 further aligns the beginning of the reference slot with slot #0 of the cell 121x.

As for CSI report constraint (i.e., uplink constraint), the UE 110 further aligns the beginning of the reference slot with slot #0 of cell for PUSCH where CSI report is transmitted. In other words, the UE 110 aligns the beginning of the reference slot with slot #0 of the cell 121x as well.

Accordingly, the UE 110 may then receive single CSI request by PDCCH from the cell 121x within the reference slot length in the cells. In particular, the UE 110 may not receive more than one CSI request by PDCCH from the cell 121x within the reference slot length. In other words, the UE 110 may then cancel expecting (i.e., the UE 110 is not expected) to receive more than more CSI request by PDCCH from the cell 121x within the reference slot length.

The UE 110 may then receive single CSI report request from the cell 121x for PUSCH within the reference slot length. In particular, the UE 110 may not receive more than one CSI report request by PUSCH from the cell 121x within the reference slot length. In other words, the UE 110 may then cancel expecting (i.e., the UE 110 is not expected) to receive more than more CSI report request by PUSCH from the cell 121x within the reference slot length.

It should be noted that each SCS of the mentioned cells may be one of 15 kHz, 30 kHz, 60 kHz, 120 kHz and 240 kHz in 5G network. However, it is not intended to limit the range and specific value of the SCSs of the cells.

Figure 5A:
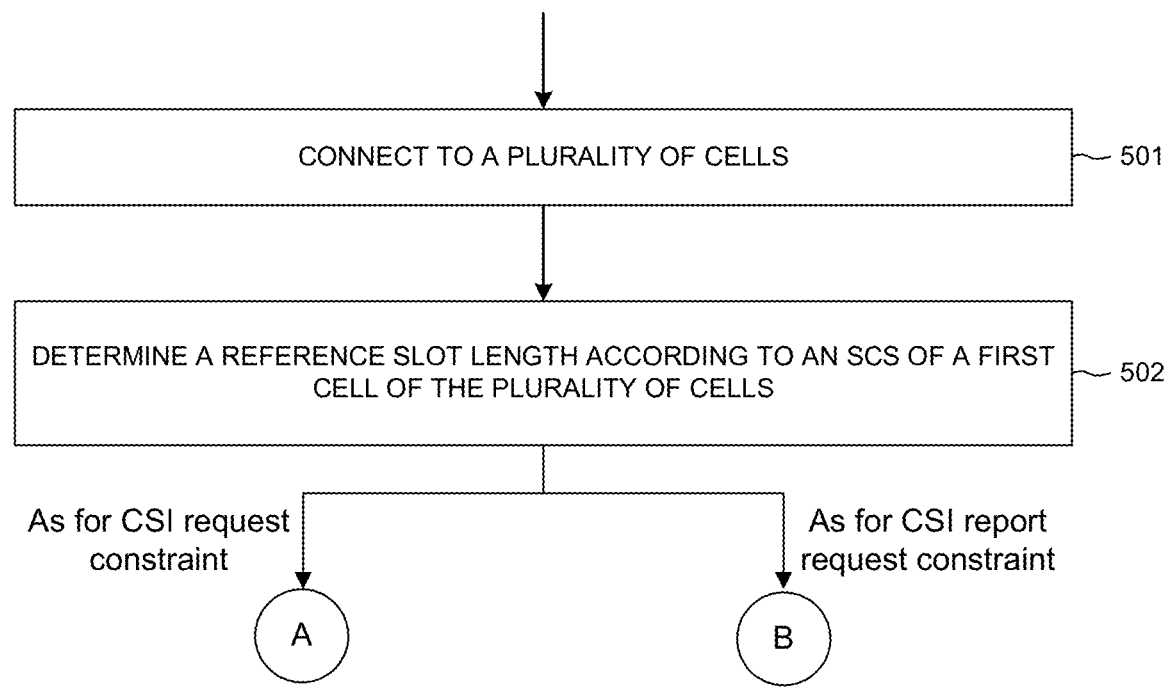
FIGS. 5A, 5B, and 5C are flow charts of a method of scheduling with multiple cells in accordance with embodiments of the current invention.
Figure 5B:
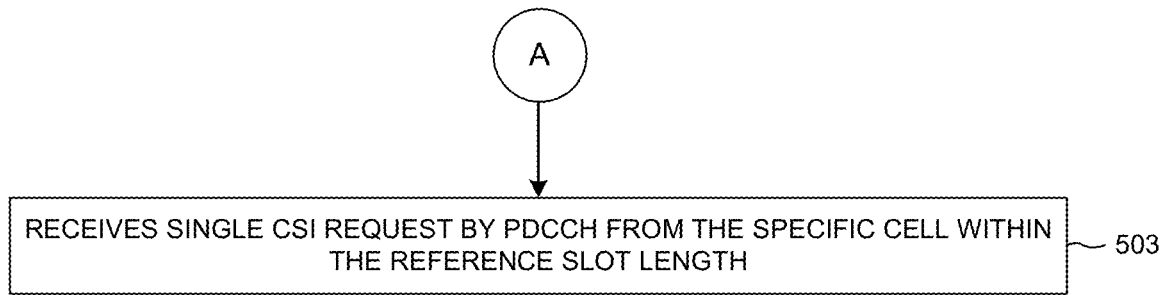
Figure 5C:
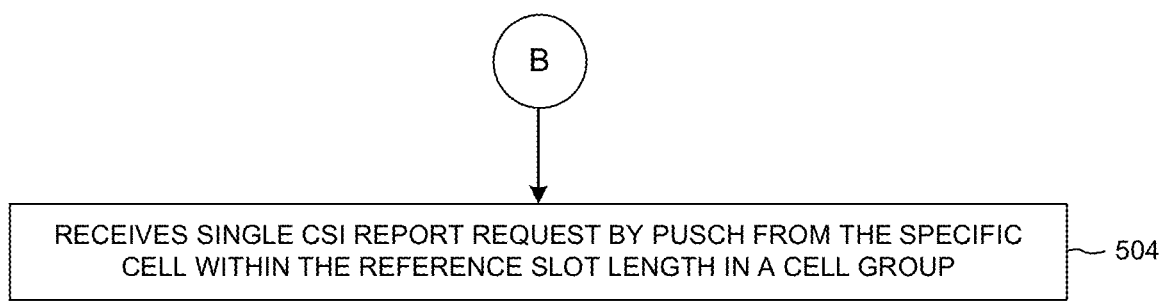

FIGS. 5A to 5C are flow charts of a method of scheduling with multiple cells from UE perspective in a 5G/NR network in accordance with one novel aspect. In step 501, a UE connects to a plurality of cells in a network. In step 502, the UE determines a reference slot length according to an SCS of a first cell of the plurality of cells.

In some embodiments, the reference slot length is equal to a length of one slot corresponding to the SCS of the first cell.

In some embodiments, the plurality of cells have at least two cells with different SCSs.

In some embodiments, the SCS of the first cell is a minimum SCS among SCSs of the plurality of cells. In some embodiments, the plurality of cells include specific cells for PDCCH, PUSCH and CSI-RS, and the SCS of the first cell is the minimum SCS among SCSs of the specific cells.

In some embodiments, as for CSI request constraint, a beginning of the reference slot length is aligned with first slot of a specific cell for PDCCH. Accordingly, in step 503, the UE receives single CSI request by PDCCH from the specific cell within the reference slot length. In particular, the UE may not receive more than one CSI request by PDCCH from the specific cell within the reference slot length, and may only execute one CSI request within the reference slot. In other words, the UE may then cancel expecting (i.e., the UE is not expected) to receive more than more CSI request from the specific cell within the reference slot length. In some embodiments, CSI request is included in a DCI.

In some embodiments, as for uplink constraint, the beginning of the reference slot length is aligned with a first slot of a specific cell for PUSCH. Accordingly, in step 504, the UE receives single CSI report request by PUSCH from the specific cell within the reference slot length in a cell group. In particular, the UE may not receive more than one CSI report request by PUSCH from the specific cell within the reference slot length, and may only execute one CSI report request within the reference slot. In other words, the UE may then cancel expecting (i.e., the UE is not expected) to receive more than more CSI report request from the specific cell within the reference slot length.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   connecting, by a user equipment (UE), to a plurality of cells in a network, wherein the plurality of cells have at least two cells with different sub-carrier spacings (SCSs), and wherein the plurality of cells include specific cells for physical downlink control channel (PDCCH), physical uplink shared channel PUSCH) and channel state information reference signal (CSI-RS), and the SCS of the first cell is the minimum SCS among SCSs of the specific cells; and
   determining, by the UE, a reference slot length according to an SCS of a first cell of the plurality of cells, wherein the SCS of the first cell is a minimum SCS among SCSs of the plurality of cells.

2. The method of claim 1, wherein the reference slot length is equal to a length of one slot corresponding to the SCS of the first cell.

3. The method of claim 1, wherein a beginning of the reference slot length is aligned with a first slot of a specific cell for physical downlink control channel (PDCCH).

4. The method of claim 3, further comprising:
   receiving, by the UE, a single channel state information (CSI) request by PDCCH from the specific cell within the reference slot length in a cell group; or
   canceling, by the UE, expecting to receive more than one CSI request by PDCCH from the specific cell within the reference slot length in a cell group.

5. The method of claim 4, wherein the CSI request is included in a downlink control information (DCI).

6. The method of claim 1, wherein a beginning of the reference slot length is aligned with a first slot of a specific cell for physical uplink shared channel (PUSCH).

7. The method of claim 6, further comprising:
   receiving, by the UE, single channel state information (CSI) report request by PUSCH from the specific cell within the reference slot length in a cell group; or
   canceling, by the UE, expecting to receive more than one CSI report request by PUSCH from the specific cell within the reference slot length in a cell group.

8. The method of claim 1, wherein each SCS of the plurality of cells is one of 15 kHz, 30 kHz, 60 kHz, 120 KHz and 240 KHz.

9. A user equipment (UE) comprising:
   a transceiver that:
      connects to a plurality of cells in a network, wherein the plurality of cells have at least two cells with different sub-carrier spacings (SCSs), and wherein the plurality of cells include specific cells for physical downlink control channel (PDCCH), physical uplink shared channel (PUSCH) and channel state information reference signal (CSI-RS), and the SCS of the first cell is the minimum SCS among SCSs of the specific cells, and the SCS of the first cell is the minimum SCS among SCSs of the specific cells;
   a scheduling circuit that:
      determines a reference slot length according to an SCS of a first cell of the plurality of cells, wherein the SCS of the first cell is a minimum SCS among SCSs of the plurality of cells.

10. The UE of claim 9, wherein the reference slot length is equal to a length of one slot corresponding to the SCS of the first cell.

11. The UE of claim 9, wherein the reference slot length is aligned with a first slot of a specific cell for physical downlink control channel (PDCCH).

12. The UE of claim 11, wherein the transceiver further:
receives a single channel state information (CSI) request by PDCCH from the specific cell within the reference slot length in a cell group; or
cancels expecting to receive more than one CSI request by PDCCH from the specific cell within the reference slot length in a cell group.

13. The UE of claim 12, wherein the CSI request is included in a downlink control information (DCI).

14. The UE of claim 9, wherein the reference slot length is aligned with a first slot of a specific cell for physical uplink shared channel (PUSCH).

15. The UE of claim 14, wherein the transceiver further:
receives single channel state information (CSI) report request by PUSCH from the specific cell within the reference slot length in a cell group; or
cancels expecting to receive more than one CSI report request by PUSCH from the specific cell within the reference slot length in a cell group.

16. The UE of claim 9, wherein each SCS of the plurality of cells is one of 15 kHz, 30 kHz, 60 kHz, 120 KHz and 240 KHz.

* * * * *